US010754588B2

(12) United States Patent
Guim Bernat et al.

(10) Patent No.: US 10,754,588 B2
(45) Date of Patent: Aug. 25, 2020

(54) PERFORMING DATA OPERATIONS IN A STORAGE AREA NETWORK

(71) Applicant: Intel Corporation, Santa Clara, CA (US)

(72) Inventors: Francesc Guim Bernat, Barcelona (ES); Kshitij A. Doshi, Tempe, AZ (US); Daniel Rivas Barragan, Cologne (DE)

(73) Assignee: Intel Corporation, Santa Clara, CA (US)

(*) Notice: Subject to any disclaimer, the term of this patent is extended or adjusted under 35 U.S.C. 154(b) by 223 days.

(21) Appl. No.: 15/476,875

(22) Filed: Mar. 31, 2017

(65) Prior Publication Data

US 2018/0284993 A1 Oct. 4, 2018

(51) Int. Cl.

| | |
|---|---|
| ***G06F 3/06*** | (2006.01) |
| ***G06F 9/54*** | (2006.01) |
| ***H04L 29/08*** | (2006.01) |
| ***G06F 9/48*** | (2006.01) |
| ***G06F 8/41*** | (2018.01) |
| ***G06F 9/50*** | (2006.01) |

(52) U.S. Cl.

CPC ............ *G06F 3/067* (2013.01); *G06F 3/0626* (2013.01); *G06F 3/0661* (2013.01); *G06F 8/433* (2013.01); *G06F 9/4843* (2013.01); *G06F 9/5027* (2013.01); *G06F 9/545* (2013.01); *H04L 67/1097* (2013.01)

(58) Field of Classification Search

CPC ........ G06F 3/067; G06F 9/5005; G06F 8/433; G06F 3/0647; G06F 9/545; G06F 9/4843; H04L 67/1097

See application file for complete search history.

(56) References Cited

U.S. PATENT DOCUMENTS

| | | | | |
|---|---|---|---|---|
| 7,444,500 | B1 * | 10/2008 | Jones | G06F 9/45533 712/228 |
| 2011/0093699 | A1 * | 4/2011 | Lovrien | H04L 63/06 713/164 |
| 2016/0224482 | A1 * | 8/2016 | Murata | G06F 13/24 |
| 2018/0260257 | A1 * | 9/2018 | Okada | G06F 9/468 |

* cited by examiner

*Primary Examiner* — Michael A Keller

(74) *Attorney, Agent, or Firm* — Compass IP Law PC

(57) ABSTRACT

Technology for a controller in a storage area network (SAN) node operable to perform data requests is described. The controller can receive a data request from a remote node. The data request can specify a data payload and a type of operation associated with the data request. The controller can select a kernel from a kernel table stored in the memory based on a set of rules. The kernel can be matched to the data request in accordance with the set of rules. The kernel can be configured using a bit stream. The controller can execute the kernel in order to perform the data request in accordance with the data payload and the type of operation.

26 Claims, 8 Drawing Sheets

PERFORMING DATA OPERATIONS IN A STORAGE AREA NETWORK

BACKGROUND

Data centers are facilities that house a plurality of computing nodes. For example, a typical data center can include hundreds or thousands of computing nodes. The computing nodes can include processing capabilities to perform computing and memory for data storage. Data centers can include network switches and/or routers to enable communication between different computing nodes in the data center. Data centers can employ redundant or backup power supplies, redundant data communications connections, environmental controls (e.g., air conditioning, fire suppression) and various security devices. In one example, data centers can include a plurality of computing nodes that communicate with each other over a high-speed storage area network (SAN).

Data centers can employ various types of memory, such as volatile memory or non-volatile memory. Non-limiting examples of volatile-memory include dynamic random access memory (DRAM) and synchronous dynamic random access memory (SDRAM). Non-limiting examples of non-volatile memory include flash memory and solid-state storage.

BRIEF DESCRIPTION OF THE DRAWINGS

Features and advantages of invention embodiments will be apparent from the detailed description which follows, taken in conjunction with the accompanying drawings, which together illustrate, by way of example, invention features; and, wherein.

Figure 1:
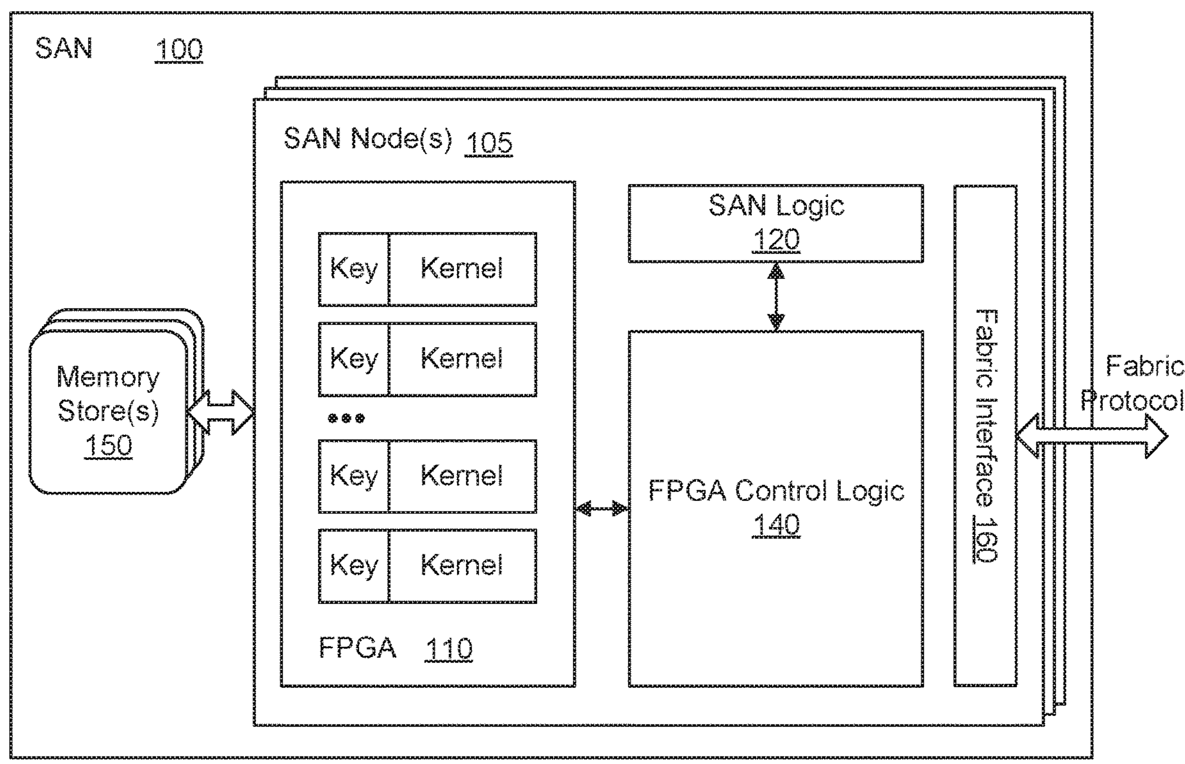
FIG. 1 illustrates a SAN that includes a SAN node with a field programmable gate array (FPGA) and FPGA control logic in accordance with an example embodiment.

Reference will now be made to the exemplary embodiments illustrated, and specific language will be used herein to describe the same. It will nevertheless be understood that no limitation on invention scope is thereby intended.

DESCRIPTION OF EMBODIMENTS

Before the disclosed invention embodiments are described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular examples or embodiments only and is not intended to be limiting. The same reference numerals in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to provide a thorough understanding of various invention embodiments. One skilled in the relevant art will recognize, however, that such detailed embodiments do not limit the overall inventive concepts articulated herein, but are merely representative thereof.

As used in this specification and the appended claims, the singular forms "a," "an" and "the" include plural referents unless the context clearly dictates otherwise. Thus, for example, reference to "a bit line" includes a plurality of such bit lines.

Reference throughout this specification to "an example" means that a particular feature, structure, or characteristic described in connection with the example is included in at least one embodiment of the present invention. Thus, appearances of the phrases "in an example" or "an embodiment" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations under the present disclosure.

Furthermore, the described features, structures, or characteristics can be combined in any suitable manner in one or more embodiments. In the following description, numerous specific details are provided, such as examples of layouts, distances, network examples, etc., to provide a thorough understanding of invention embodiments. One skilled in the relevant art will recognize, however, that the technology can be practiced without one or more of the specific details, or with other methods, components, layouts, etc. In other instances, well-known structures, materials, or operations may not be shown or described in detail to avoid obscuring aspects of the disclosure.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term in this specification, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

As used herein, comparative terms such as "increased," "decreased," "better," "worse," "higher," "lower," "enhanced," and the like refer to a property of a device, component, or activity that is measurably different from other devices, components, or activities in a surrounding or adjacent area, in a single device or in multiple comparable devices, in a group or class, in multiple groups or classes, or as compared to the known state of the art. For example, a data region that has an "increased" risk of corruption can refer to a region of a memory device which is more likely to have write errors to it than other regions in the same memory device. A number of factors can cause such increased risk, including location, fabrication process, number of program pulses applied to the region, etc.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

Numerical amounts and data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

An initial overview of technology embodiments is provided below and then specific technology embodiments are described in further detail later. This initial summary is intended to aid readers in understanding the technology more quickly, but is not intended to identify key or essential technological features nor is it intended to limit the scope of the claimed subject matter. Unless defined otherwise, all technical and scientific terms used herein have the same meaning as commonly understood by one of ordinary skill in the art to which this disclosure belongs.

Modern business applications can be increasingly structured as hundreds of modular services. In contrast to complex monolithic servers utilized in the past, these modular services can form a web of individually simple but densely interactive components. These interactive components can allow for seamless integration of sophisticated capabilities, quick debugging, incremental testing, modular implementation and deployment, fault isolation, scalable orchestration, etc. However, the change from complex monolithic servers to modular services with a dense number of interactive components has resulted in amplified interaction and data crunching. For example, for a single macro operation (e.g., a user-level commercial transaction), hundreds of request-response interactions can potentially occur among servers that each host these modular services. At each server, milliseconds of latencies can add up as data in memory is fetched, transformed, and stored a multitude of times for the single macro operation. These data interactions can occur hundreds or thousands of times per second across a large service, which in certain situations, can produce latencies as high as 700 milliseconds (ms).

While it may be possible to simply insert general purpose processors at a storage node and execute functions on these general purpose processors in the storage node, these general purpose processors can become a bottleneck as data volume grows. In addition, the storage node may be simultaneously producing data to servers and consuming data from servers. Therefore, the general purpose processors in the storage node would be in demand for serving a large number of requestors. As compared to massively multi-core servers with generous power budgets, these storage-side general purpose processors would be fewer in number and subject to power constraints; but at the same time they would be burdened with handling an increased amount of data.

In the present technology, novel functionalities for remote storage and novel fabric protocols for defining storage topologies and rules are defined herein. These novel functionalities for remote storage and novel fabric protocols can be utilized in a data center that utilizes a SAN. This technology can be applicable when compute nodes provide both data and derived-data generated from that data (e.g., database metadata) over a network fabric for storage in a memory store in the SAN, which can consume a relatively large amount of network bandwidth. This technology can be applicable when compute nodes provide a relatively large amount of data over a network fabric to be stored in a memory store in the SAN, especially when starting from a relatively small working data set (e.g., from compact transaction data to indexes for analytics), which can again consume a relatively large amount of network bandwidth. This technology can be applicable to computing or streaming elements, such as Internet of Things (IoT) devices, that continuously send data streams for storage in a memory store in the SAN. It is important to efficiently process these data streams, which can be costly in terms of computation and/or storage, in order to trigger responsive actions based on events indicated by the data stream. In addition, this technology can be applicable to scale-out architectures where storage is used as a means of sharing data and coordinating its processing, which can be costly in terms of storage and network bandwidth.

In one example, the memory store in the SAN can include a memory with volatile memory, nonvolatile memory (NVM), or a combination thereof. Volatile memory is a storage medium that requires power to maintain the state of data stored by the medium. Exemplary memory can include any combination of random access memory (RAM), such as static random access memory (SRAM), dynamic random access memory (DRAM), synchronous dynamic random access memory (SDRAM), and the like. SDRAM memory can include any variant thereof, such as single data rate SDRAM (SDR DRAM) and double data rate (DDR) SDRAM, including DDR, DDR2, DDR3, DDR4, DDR5, and so on, described collectively as DDRx. In some examples, DRAM complies with a standard promulgated by JEDEC, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org; DDR5 SDRAM is forthcoming). Such standards (and similar standards) may be referred to as DDR-based standards, and communication interfaces that implement such standards may be referred to as DDR-based interfaces. In one specific example, the system memory can be DRAM. In another specific example, the system memory can be DDRx SDRAM.

NVM is a storage medium that does not require power to maintain the state of data stored by the medium. Non-limiting examples of NVM can include any or a combination of solid state memory (such as planar or three-dimensional (3D) NAND flash memory, NOR flash memory, or the like), cross point array memory, including 3D cross point memory, phase change memory (PCM), such as chalcogenide PCM, non-volatile dual in-line memory module (NVDIMM), byte addressable nonvolatile memory, ferroelectric memory (Fe-RAM), silicon-oxide-nitride-oxide-silicon (SONOS) memory, polymer memory (e.g., ferroelectric polymer memory), ferroelectric transistor random access memory (Fe-TRAM), spin transfer torque (STT) memory, nanowire memory, electrically erasable programmable read-only memory (EEPROM), magnetic storage memory, magnetoresistive random-access memory (MRAM), write in place non-volatile MRAM (NVMRAM), nanotube RAM (NRAM), and the like. These types of non-volatile memory may be byte or block addressable. In some examples, non-volatile memory can comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at www.jedec.org). In one specific example, the memory can be 3D cross point memory. In another specific example, the memory can be NAND or 3D NAND memory. In another specific example, the system memory can be STT memory.

In the present technology, flexible, scalable, and low latency data processing proximal to a storage medium can be provided in a SAN. The term "SAN" can refer to a traditional SAN architecture in which access to consolidated data storage is provided, as well as a SAN architecture that provides access to disaggregated storage. As described in further detail below, low latency data processing can be achieved using control logic within a SAN node. For example, the control logic can be FPGA control logic. The control logic can store multiple algorithms in the form of bit streams to process incoming/outgoing data from/to remote entities or elements (e.g., compute nodes, IoT devices, etc.) according to a set of dynamically configurable rules that associate the bit streams to specific data streams. In other words, each data stream can be processed differently depending on an associated bit stream (as determined using the set of dynamically configurable rules). More specifically, each bit stream (e.g., configuration data) can be used to configure a kernel, and the kernel can be used to process a corresponding data stream accordingly. The processing of a data stream can involve storing a stream of data to a memory store in the SAN, or reading a stream of data from a memory store in the SAN. The set of dynamically configurable rules can be applicable for specific stream identifiers (IDs), data streams from specific compute nodes included in a list, specific messages, etc.

In previous solutions, logic for handling data streams to/from storage media was placed in or near a compute node and accessed over local buses, such as Peripheral Component Interconnect Express (PCIe), Coherent Accelerator Processor Interface (CAPI), etc., which can be overly cumbersome.

In contrast, in the present technology, logic (e.g., FPGA logic) can be placed in a SAN, and the logic can be utilized to handle data streams to/from storage media in the SAN, thereby achieving faster and more power-efficient execution. In other words, the usage of the logic can result in accelerated storage in the SAN. This solution (e.g., which utilizes FPGA logic) can be provided as a service that is made available for customization in a networked environment, such that broad spectrum storage side processing requirements of diverse applications can be fulfilled seamlessly and efficiently. In the present technology, the logic for handling data streams to/from storage media may not be part of a single machine, and therefore, are highly available and sharable.

The present technology can provide a number of benefits. For example, logic can be placed in a shared storage service, such as the SAN. The logic can be deployed in system topologies with heterogeneous and low compute power devices, such as IoT devices. The logic can be used to create autonomous intelligence at memory stores, by sending operations for execution at/near memory stores, where such operations can be executed over bulk input payloads arriving from the memory stores and bulk output payloads (if applicable) sent to the memory stores. The usage of the logic can achieve greater power efficiency, lower latency and reduces network fabric bandwidth by performing offloadable data transformations at/near memory stores. In addition, SAN nodes can download and install logic functions either in-flow or out-of-band from other SAN nodes in the SAN, thereby providing for programmable storage logic that can be shared horizontally across the SAN nodes in the SAN.

FIG. 1 illustrates an exemplary SAN 100 that includes one or more SAN node(s) 105 with a FPGA 110 and FPGA control logic 140. The SAN 100 can include one or more memory store(s) 150. The FPGA control logic 140 can be novel logic that enables efficient data storage of data in the memory store(s) 150 using information (e.g., kernels) maintained at the FPGA 110. The memory store(s) 150 can include volatile memory, NVM, or a combination thereof. The SAN node 105 can include SAN logic 120 (e.g., logic implementing existing functionalities) and a fabric interface 160. The fabric interface 160 can enable communication between the SAN node 105 and compute elements (e.g., compute nodes, IoT devices) using a fabric protocol.

In one configuration, the FPGA control logic 140 (or similar type of programmable logic) can process separate streams of data (or data streams). For example, the FPGA control logic 140 can enable the SAN node 105 to register algorithms as bit streams (or FPGA bit streams). The bit streams can refer to configuration data that is loaded into FPGAs (as FPGAs are often configured from a serial bit stream), although FPGAs can also support byte-parallel loading. In other words, the bit streams can be used to program the FPGA 110. In one example, the bit streams can be used to configure kernels, which can function as programs or routines. A given kernel can be updated by modifying a corresponding bit stream. Thus, the FPGA control logic 140 can use the kernels to process streams of data to/from one or more compute elements (e.g., compute nodes, IoT devices) accordingly. The kernels can be maintained in a kernel table by the FPGA 110 in the SAN node 105.

The FPGA control logic 140 can determine which kernel to apply to the streams of data based on a set of dynamically configurable rules. For example, the set of dynamically configurable rules can specify that: a stream of data from a particular compute element (or type of compute element, such as an IOT device) is to be processed using a particular kernel, a specific type of message is to be processing using a particular kernel, a stream of data with a specific stream ID is to be processing using a particular kernel, etc. In other words, the set of dynamically configurable rules can specify which kernels (which are configured by corresponding bit streams) are associated with certain streams of data.

The processing of the stream of data using a particular kernel can involve storing the stream of data in the memory store(s) 150, or the processing of the stream of data using a particular kernel can involve reading the stream of data from the memory store(s) 150. In other words, the FPGA control logic 140 can use the kernels to process incoming/outgoing streams of data. In addition, the processing of the stream of data using a particular kernel can involve performing various types of computations on the stream of data. Different kernels can function to perform different computations on a given stream of data. For example, there can be different kernels for performing a Fourier transformation, matrix multiplication, etc. These computations can be performed on a stream of data that is then stored in the memory store(s) 150, or these computations can be performed on a stream of data that is read from the memory store(s) 150. There can also be special types of kernels, such as security kernels, etc. Therefore, upon identifying a stream of data (either from the memory store 150 or received from the compute elements), the FPGA control logic 140 can access the set of dynamically configurable rules to determine which kernel (which is configured by a corresponding bit stream) is to be applied to the stream of data, and then the FPGA control logic 140 can process the stream of data using a selected kernel.

In one example, the FPGA control logic 140 can select a kernel to process a stream of data based on specified parameters, such as an acceleration ID and/or an acceleration class ID. The acceleration ID can associate message data to a certain kernel (or bit stream). The acceleration class ID can indicate a particular kernel type (or bit stream type), such as a security kernel or bit stream. In one example, the set of dynamically configurable rules can indicate that certain kernels are to be utilized for specific acceleration IDs or acceleration class IDs.

As an example, the FPGA control logic 140 in the SAN node 105 can receive a request to process (e.g., store) a stream of data, and the request can be received from a remote entity or element, such as a compute node or IoT device. The FPGA control logic 140 can access the set of dynamically configurable rules to determine which kernel (or bit stream) is to be utilized to process the stream of data. The FPGA control logic 140 can select an appropriate kernel (or bit stream) based on the set of dynamically configurable rules, and then process the stream of data accordingly. For example, the stream of data can be written to the memory store(s) 150 in the SAN node 105 in accordance with the appropriate kernel (or bit stream).

In one example, the FPGA control logic 140 can receive an input represented by IN(@InData), for example, and using the kernel, the FPGA control logic 140 can produce an output represented by OUT(@OutData), for example. In other words, the FPGA control logic 140 can utilize the kernel to perform a computation on the input to produce the output, which can be represented by Compute(@inData, @OutData), for example.

In one example, the FPGA control logic 140 in the SAN node 105 can receive a request for a data operation from a remote node. The request can include a payload for input or output. For example, when the remote node is sending the request to process and store data, the payload can be message data. When the remote node is requesting data from storage, the payload can include data handles on the memory store(s) 150 (i.e., a reference to certain resources in the memory store(s) 150). In this case, the payload can be read from the memory store(s) 150 and directed to the remote node that sent the request.

In one example, the FPGA control logic 140 in the SAN node 105 can generate messages to specified or pre-registered destinations when, during processing of a request, certain conditions are triggered. As a non-limiting example, if an IoT sensor is generating data which fails consistency conditions, this event can be detected and flagged. In response, a destination network interface controller (NIC) can interrupt and convey notifications to exception handlers.

In one configuration, the FPGA control logic 140 can be utilized to implement various flows, such as flows for: determining whether the kernel table maintained by the FPGA 110 in the SAN node 105 includes a specified kernel, discovering a list of kernels maintained by the FPGA 110 in the SAN node 105, and running kernels to perform data operations with streams of data (e.g., read and write operations, data computations). The FPGA control logic 140 can process storage requests from other SAN nodes in the SAN 100 (i.e., other nodes in a data center). The FPGA control logic 140 can manage the kernel table in the FPGA 110 using kernel table control logic. For example, the FPGA control logic 140 can register, de-register and control access to the kernel table. In addition, the FPGA control logic 140 can process storage requests targeting the SAN 100 and process the storage requests with an appropriate kernel (or bit stream).

In one configuration, the FPGA 110 can maintain the kernel table, which can list the kernels supported by the SAN node 105. The kernel table can be a structure containing the different types of kernels for processing specific streams of data targeting the SAN 105. The kernel table can include a plurality of entries, and each entry can include: an ID of a kernel that is registered, a bit stream associated with the kernel (i.e., used to configure the kernel), and a rule specifying types of data to be processed by the kernel. The ID of a given kernel can be unique among other kernel IDs utilized by the SAN 100. A kernel ID can also be referred to as a key. The bit stream can be a payload of a maximum of X bytes, wherein X is an integer. A kernel size supported by the SAN architecture can depend on cost and other product constraints. The rule can define which streams of data are to be processed by that particular kernel (or bit stream). In other words, all traffic targeting the SAN 100 that matches a particular rule can be processed by a specific kernel corresponding to that rule. The rule can specify that certain kernels are to be utilized for specific acceleration IDs or acceleration class IDs, and the rule can specify that certain kernels are to be utilized for specific node IDs (e.g., on a list). In one example, when a request (e.g., storage request) from a compute entity matches more than one kernel in the kernel table, one of the kernels can be selected based on a priority order.

Figure 2:
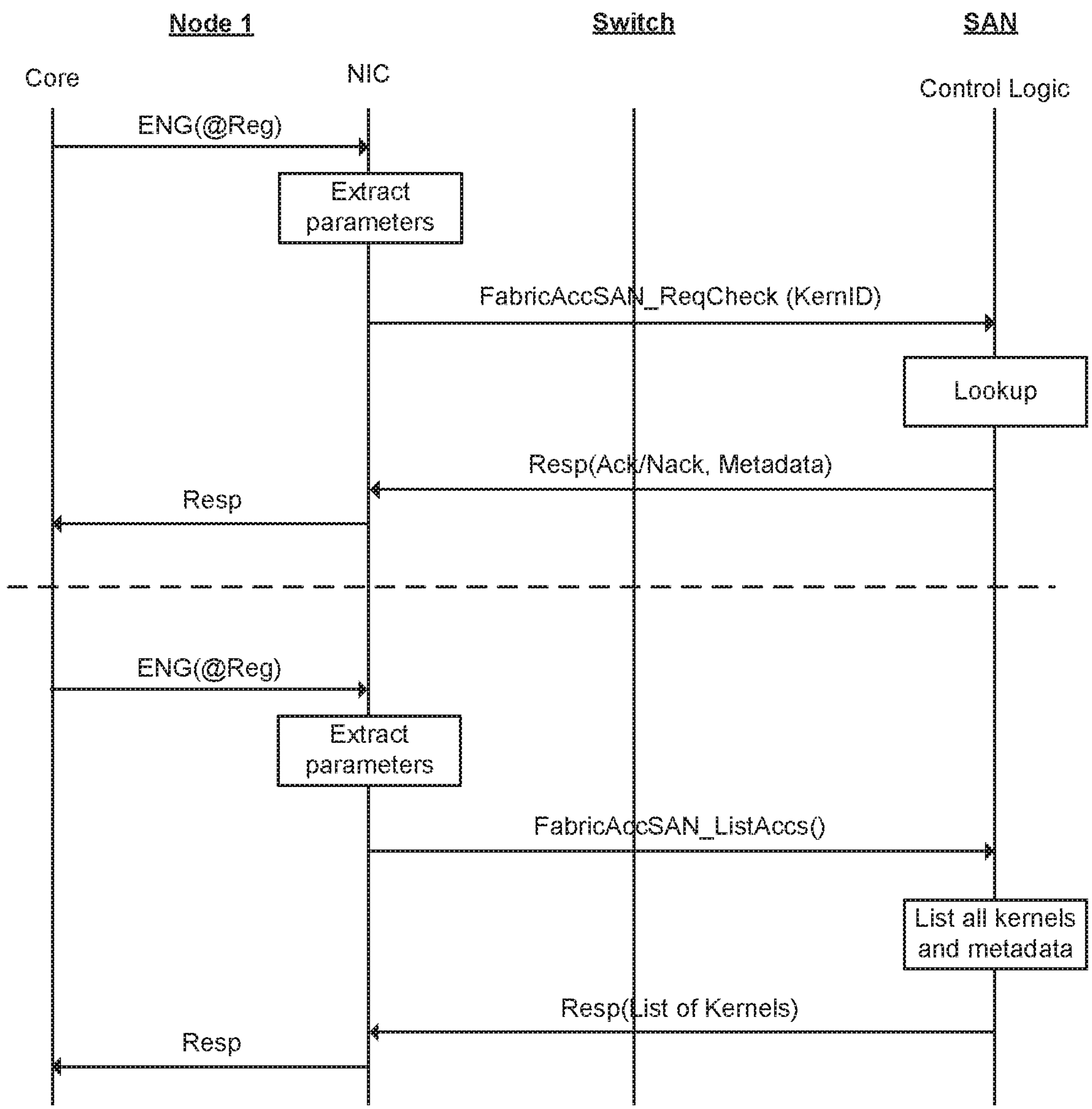
FIG. 2 illustrates a system and related operations for determining whether a SAN node includes a specified kernel and discovering a list of kernels maintained at the SAN node in accordance with an example embodiment.

FIG. 2 illustrates an exemplary system and related operations for (1) determining whether a SAN node includes a specified kernel and (2) discovering a list of kernels maintained at the SAN node. In this system, a first node (node 1) can include a core (or processor) and a NIC. The first node (node 1) can communicate with the SAN node via a switch. More specifically, the first node (node 1) can communicate with control logic (e.g., FPGA control logic) in the SAN node via the switch.

With respect to determining whether the SAN node includes the specified kernel (i.e., whether the SAN node includes a copy of the specified kernel), an application running on the core in the first node can initiate an instruction (e.g., ENG(@Reg) to be sent to the NIC in the first node. The instruction can be for a given operation. In this example, the operation can involve inquiring whether the SAN node includes the specified kernel. The instruction can pass to the NIC a pointer (in memory) to parameters for the given operation that is requested. The NIC can extract the parameters from the memory (based on the pointer), and then the NIC can proceed to execute a corresponding flow based on the instruction. In this example, the NIC can send a message over the switch to the control logic in the SAN node. The message can be represented by FabricAccSAN_ReqCheck (KernelID), for example. In other words, this message can be for inquiring whether the SAN node includes the specified kernel. The message can include a kernel ID associated with the specified kernel. The control logic in the SAN node can receive the message from the NIC. The control logic in the SAN can look up the specified kernel in a kernel table maintained by an FPGA in the SAN node, and then return a response to the NIC. The response can include an acknowledgement (ACK) when the kernel table in the FPGA includes the specified kernel (based on the kernel ID), or alternatively, the response can include a negative acknowledgement (NACK) when the kernel table in the FPGA does not include the specified kernel. The NIC can forward the response to the core in the first node.

With respect to discovering the list of kernels maintained at the SAN node, an application running on the core in the first node can initiate an instruction (e.g., ENG(@Reg) to be sent to the NIC in the first node. The instruction can be for a given operation. In this example, the operation can involve discovering the list of kernels maintained at the SAN node. The instruction can pass to the NIC a pointer (in memory) to parameters for the given operation that is requested. The NIC can extract the parameters from the memory (based on the pointer), and then the NIC can proceed to execute a corresponding flow based on the instruction. In this example, the NIC can send a message over the switch to the control logic in the SAN node. The message can be represented by FabricAccSAN_ListAccs( ) for example. In other words, this message can be for discovering the list of kernels maintained at the SAN node. The control logic in the SAN node can receive the message from the NIC. The control logic in the SAN node can identify a list of kernels and corresponding metadata from a kernel table maintained by an FPGA in the SAN node, and then return a response to the NIC. The response can include the list of kernels and corresponding metadata. The NIC can forward the response to the core in the first node.

In one configuration, control logic in the SAN node can register a new kernel. For example, an application running on a local node can provide a pointer to a memory region. Information for registering the new kernel can be placed at the pointer to the memory region. This information can include a bit stream for a kernel, metadata, a kernel ID, and an identification of a remote node (i.e., the SAN node) in which the kernel is to be registered. A requestor NIC in the local node can extract the information for registering the new kernel based on the pointer to the memory region, and then generate a fabric FPGA registration message. The fabric FPGA registration message can be provided to the remote node, and the fabric FPGA registration message can include the extracted information for registering the new kernel. The remote node can determine, via the control logic (e.g., FPGA control logic), whether a size of the bit stream exceeds a supported size. When the size of the bit stream does not exceed the supported size, the control logic can proceed to register the new kernel (as identified in the information included in the fabric FPGA registration message). When the remote node does not have free space to allocate the new kernel, the control logic can send an error message to the NIC in the local node.

Figure 3:
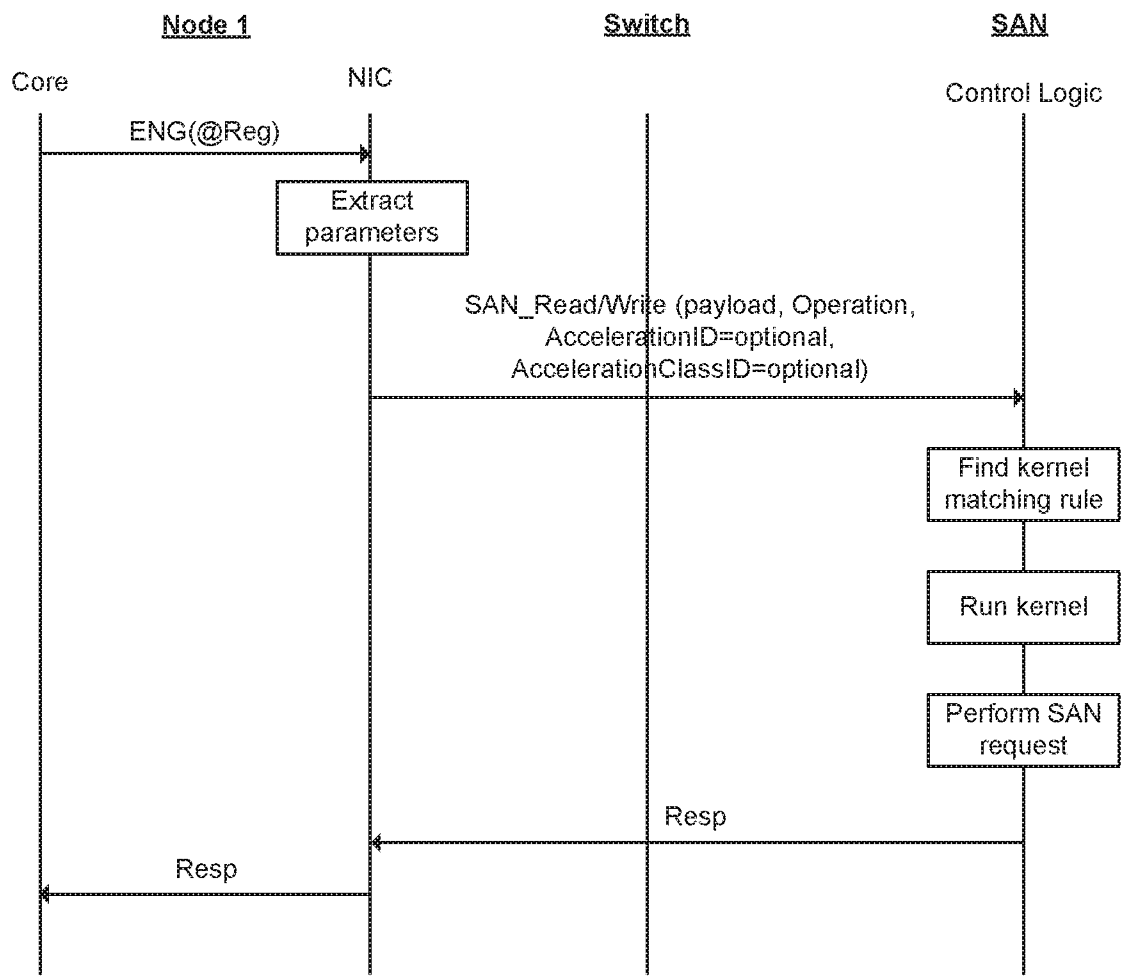
FIG. 3 illustrates a system and related operations for running kernels at a SAN node to perform data operations in accordance with an example embodiment.

FIG. 3 illustrates an exemplary system and related operations for running kernels at a SAN node to perform data operations. In this system, a first node (node 1) can include a core (or processor) and a NIC. The first node (node 1) can communicate with the SAN node via a switch. More specifically, the first node (node 1) can communicate with control logic (e.g., FPGA control logic) in the SAN node via the switch.

In one configuration, an application running on the core in the first node (node 1) can initiate an instruction (e.g., ENG(@Reg) to be sent to the NIC in the first node. The instruction can be for a given operation. In this example, the operation can involve requesting a read/write data operation to be performed at the SAN node using an appropriate kernel. The instruction can pass to the NIC a pointer (in memory) to parameters for the given operation that is requested. The NIC can extract the parameters from the memory (based on the pointer), and then the NIC can proceed to execute a corresponding flow based on the instruction. In this example, the NIC can send a message over the switch to the control logic in the SAN node. The message can be represented by SAN_Read/Write, for example. In other words, the message can be a request for performing read/write data operations at the SAN node using an appropriate kernel. The message can include a payload (i.e., data to be written to memory in the SAN or an indication of data to be read from memory in the SAN) and a type of operation to be performed. As optional parameters, the message can include an acceleration ID and/or an acceleration class ID.

The control logic in the SAN node can receive the message from the NIC. The control logic in the SAN can identify an appropriate kernel to fulfill the request for the read/write data operation, and the appropriate kernel can be identified using a kernel matching rule. The control logic can possibly use the acceleration ID and/or acceleration class ID when selecting the appropriate kernel. The control logic can run the kernel in order to perform the read/write data operation requested by the first node (node 1). For example, the control logic can fulfill the request by reading data from a memory store in the SAN (a read operation) or writing data to a memory store in the SAN (a write operation), and the read/write operation can be performed based on the payload and operation parameters included in the message. The control logic can fulfill the request, and then provide a response acknowledging that the request has been fulfilled to the NIC. The NIC can forward the response to the core in the first node.

In one configuration, a compute element can generate a network attached storage (NAS) read/write request message. A NIC in the compute element can provide the NAS read/write request message to a SAN node. The NAS read/write request message can explicitly specify an acceleration ID or an acceleration class ID. Otherwise, control logic in the SAN node can determine that the NAS read/write request message matches a specific rule, and the control logic can provide the NAS read/write request message to a corresponding FPGA kernel in the SAN node. The FPGA kernel can be run to perform the NAS read/write request, and a result can be provided to a requestor (i.e., the compute element).

Figure 4:
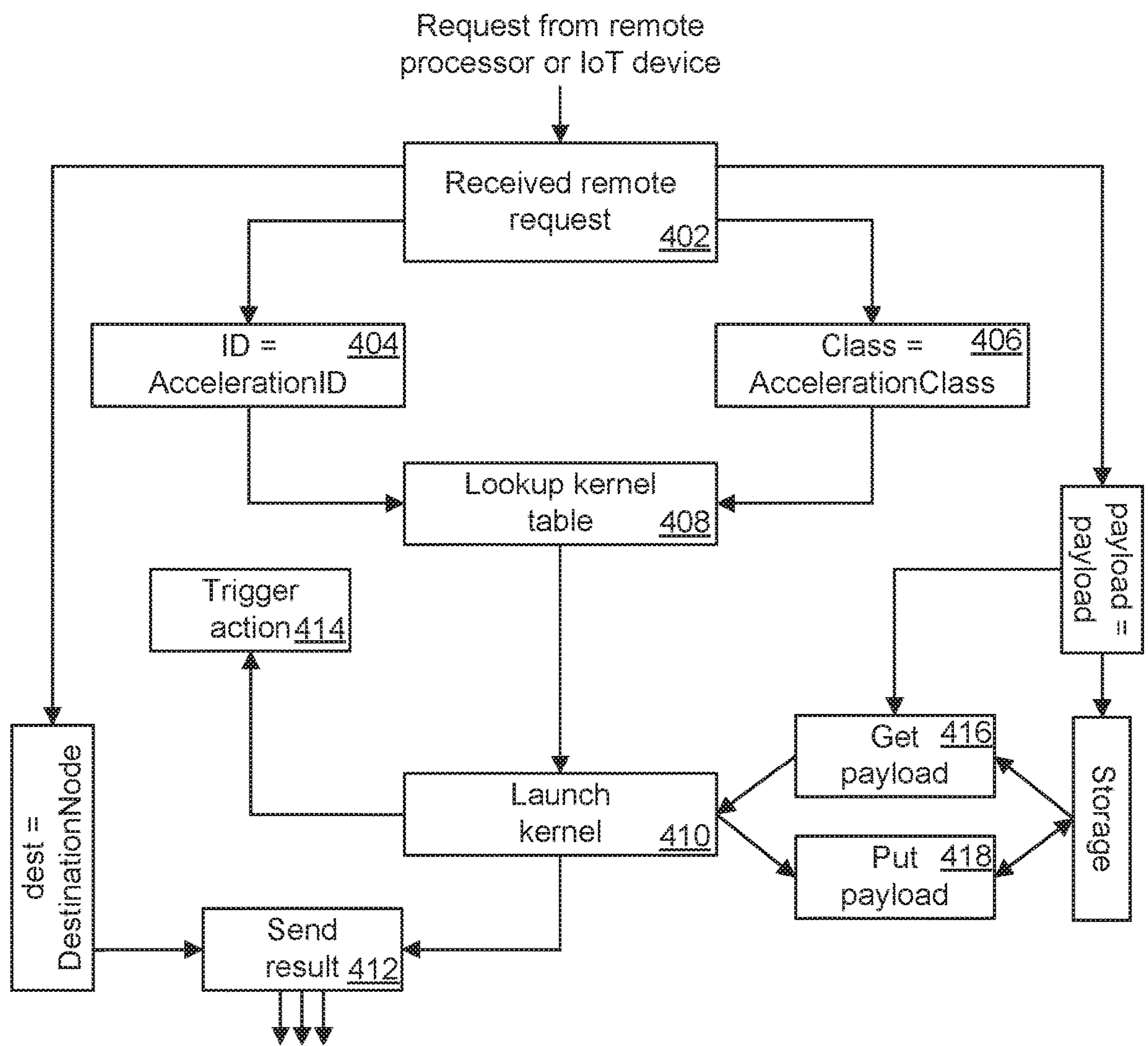
FIG. 4 is a flowchart illustrating operations for running kernels to perform data operations in accordance with an example embodiment.

FIG. 4 is a flowchart illustrating exemplary operations for running kernels to perform data operations. In block 402, a request can be received from a remote processor or IoT device. In block 404, an acceleration ID can be identified from the request. In block 406, an acceleration class ID can be identified from the request. In block 408, an FPGA kernel table can be looked up based on information included in the request (e.g., acceleration ID and/or acceleration class ID). A particular kernel can be selected from the FPGA kernel table, and in block 410, the selected FPGA kernel table can be launched to fulfill that particular request. In one example, the request can specify a payload. Depending on the operation to be performed, the payload can be an input, an output, or both an input and an output. In block 416, launching the selected kernel can cause a payload to be read from storage in accordance with the request. In block 418, launching the selected kernel can cause a payload to be written to storage in accordance with the request. In another example, the request can identify a destination node for an output (or results). In block 410, upon launching the kernel, the output (or results) can be sent or streamed to the destination node. In yet another example, during execution of the selected kernel, conditions or events can be identified that trigger specific actions, as in block 414. These specific actions can involve communicating information to certain nodes, and these nodes may or may not be the same as the destination node (or storage device) that receives the output (or results). Therefore, in some cases, the request can be for writing/reading data from storage, but in other cases, the request can trigger the performance of other specific actions.

Figure 5:
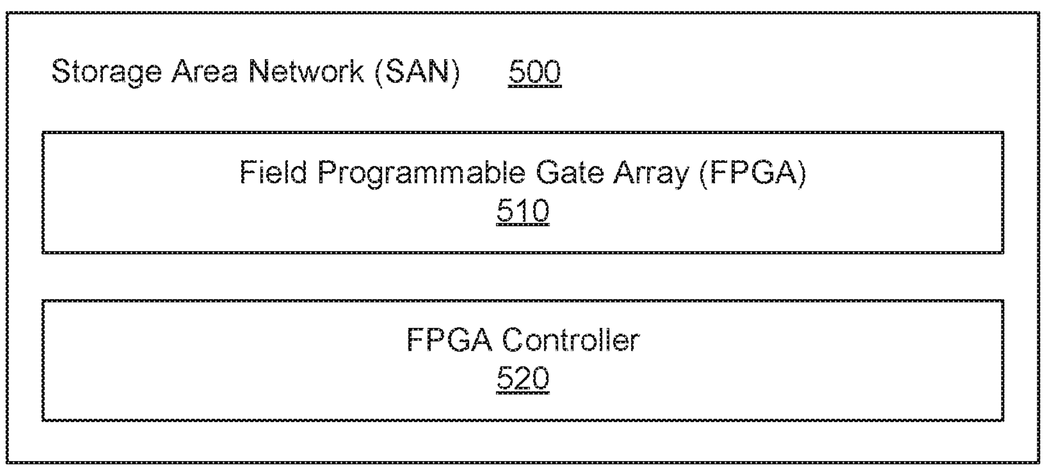
FIG. 5 illustrates a SAN node operable to perform data requests in a SAN in accordance with an example embodiment.

FIG. 5 illustrates a SAN node 500 operable to perform data requests in a SAN. The SAN node 500 can include a FPGA 510 that includes a kernel table. The SAN node 500 can include an FPGA controller 520. The FPGA controller 520 can receive a data request from a remote node. The data request can specify a data payload and a type of operation associated with the data request. The FPGA controller 520 can select a kernel from the kernel table based on a set of rules. The kernel can be matched to the data request in accordance with the set of rules. The kernel can be configured using a bit stream. The FPGA controller 520 can execute the kernel in order to perform the data request in accordance with the data payload and the type of operation.

Figure 6:
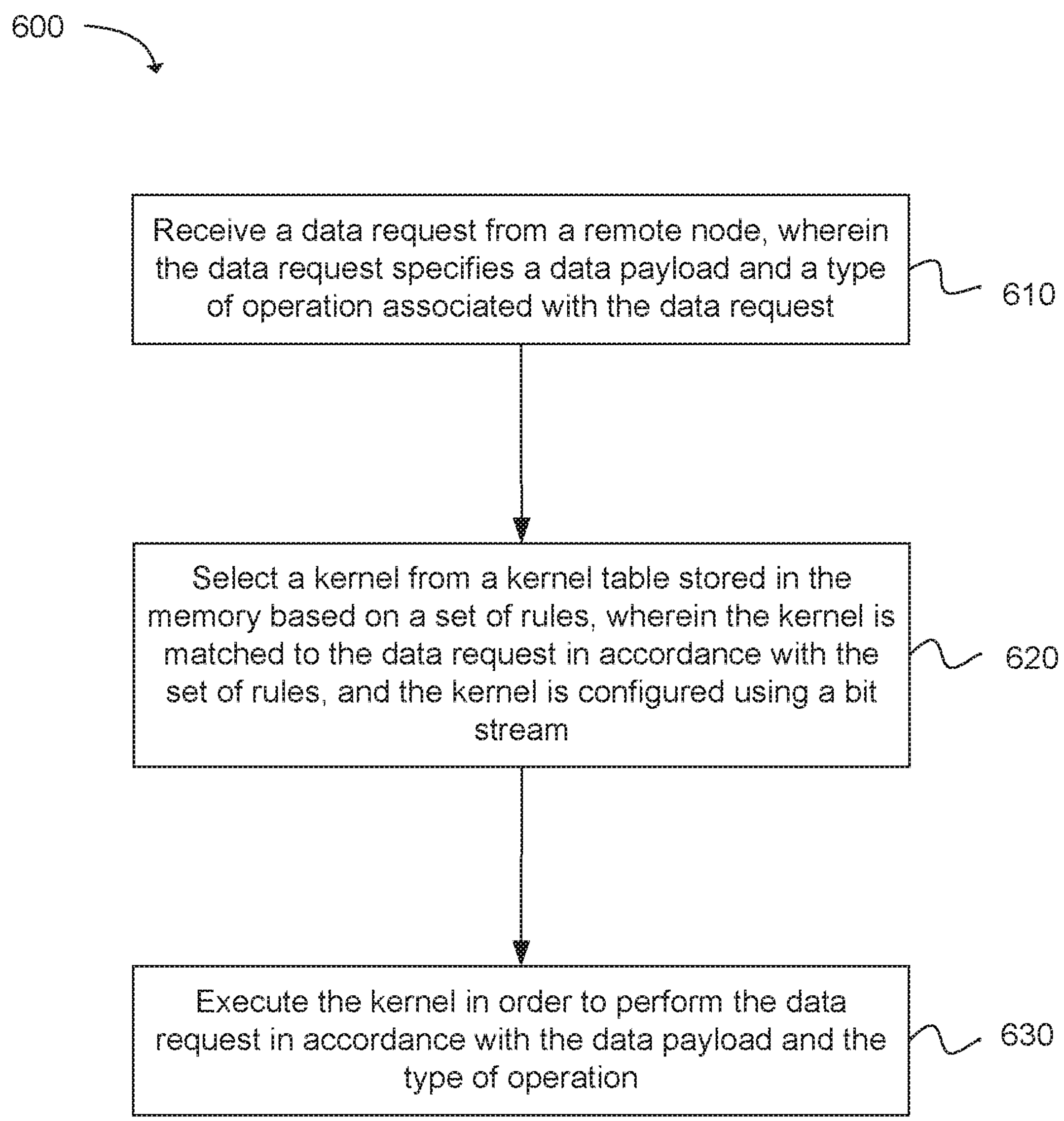
FIG. 6 illustrates functionality of a controller in a SAN node operable to perform data requests in accordance with an example embodiment.

FIG. 6 illustrates functionality of a controller in a SAN node operable to perform data requests. The controller can receive a data request from a remote node, wherein the data request specifies a data payload and a type of operation associated with the data request, as in block 610. The controller can select a kernel from a kernel table stored in the memory based on a set of rules, wherein the kernel is matched to the data request in accordance with the set of rules, and the kernel is configured using a bit stream, as in block 620. The controller can execute the kernel in order to perform the data request in accordance with the data payload and the type of operation, as in block 630.

Figure 7:
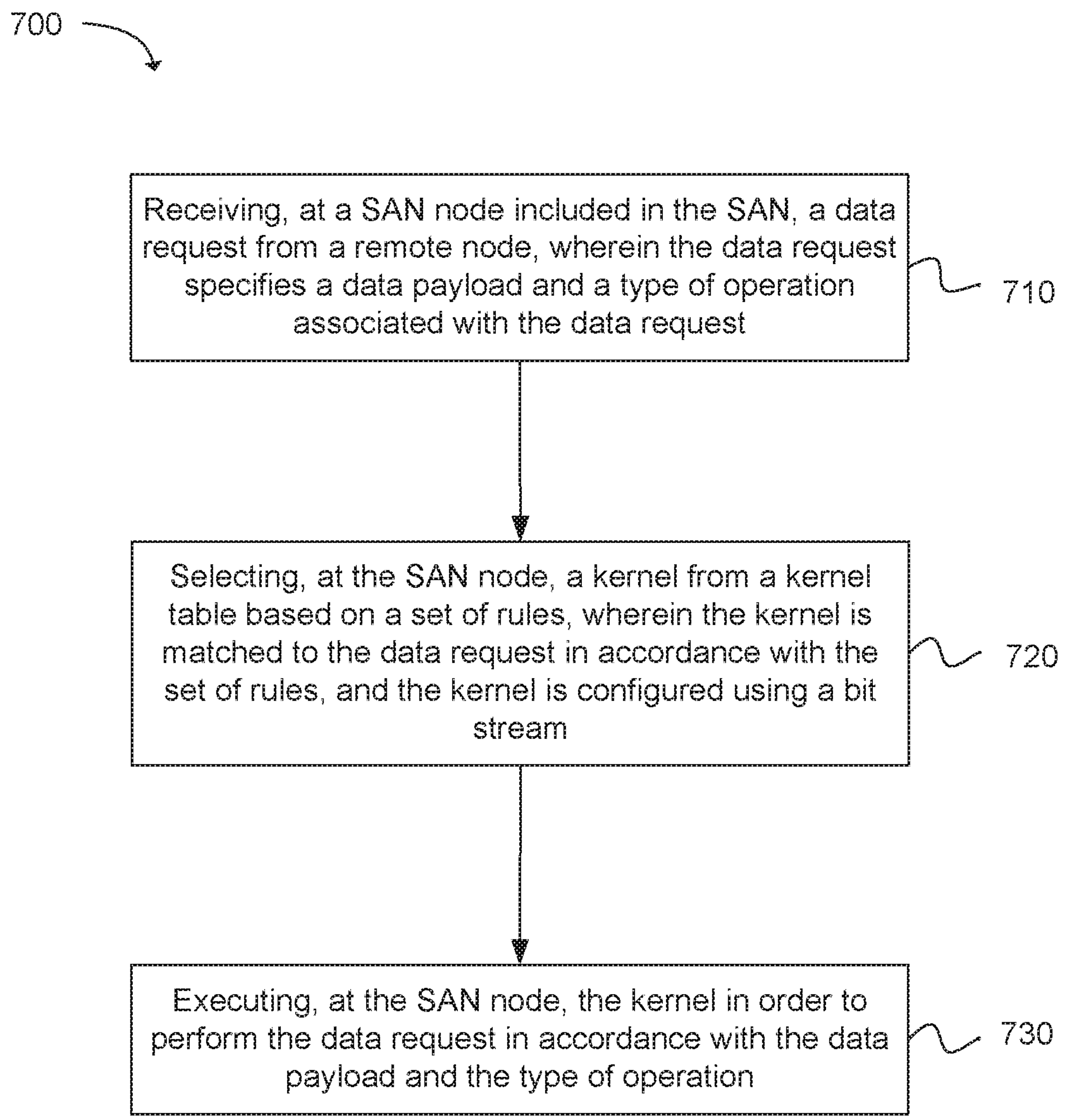
FIG. 7 depicts a flowchart of a method for performing data requests in a SAN in accordance with an example embodiment.

Another example provides a method 700 for performing data requests in a SAN, as shown in the flow chart in FIG. 7. The method can be executed as instructions on a machine, where the instructions are included on at least one computer readable medium or one non-transitory machine readable storage medium. The method can include the operation of: receiving, at a SAN node included in the SAN, a data request from a remote node, wherein the data request specifies a data payload and a type of operation associated with the data request, as in block 710. The method can include the operation of: selecting, at the SAN node, a kernel from a kernel table based on a set of rules, wherein the kernel is matched to the data request in accordance with the set of rules, and the kernel is configured using a bit stream, as in block 720. The method can include the operation of: executing, at the SAN node, the kernel in order to perform the data request in accordance with the data payload and the type of operation, as in block 730.

Figure 8:
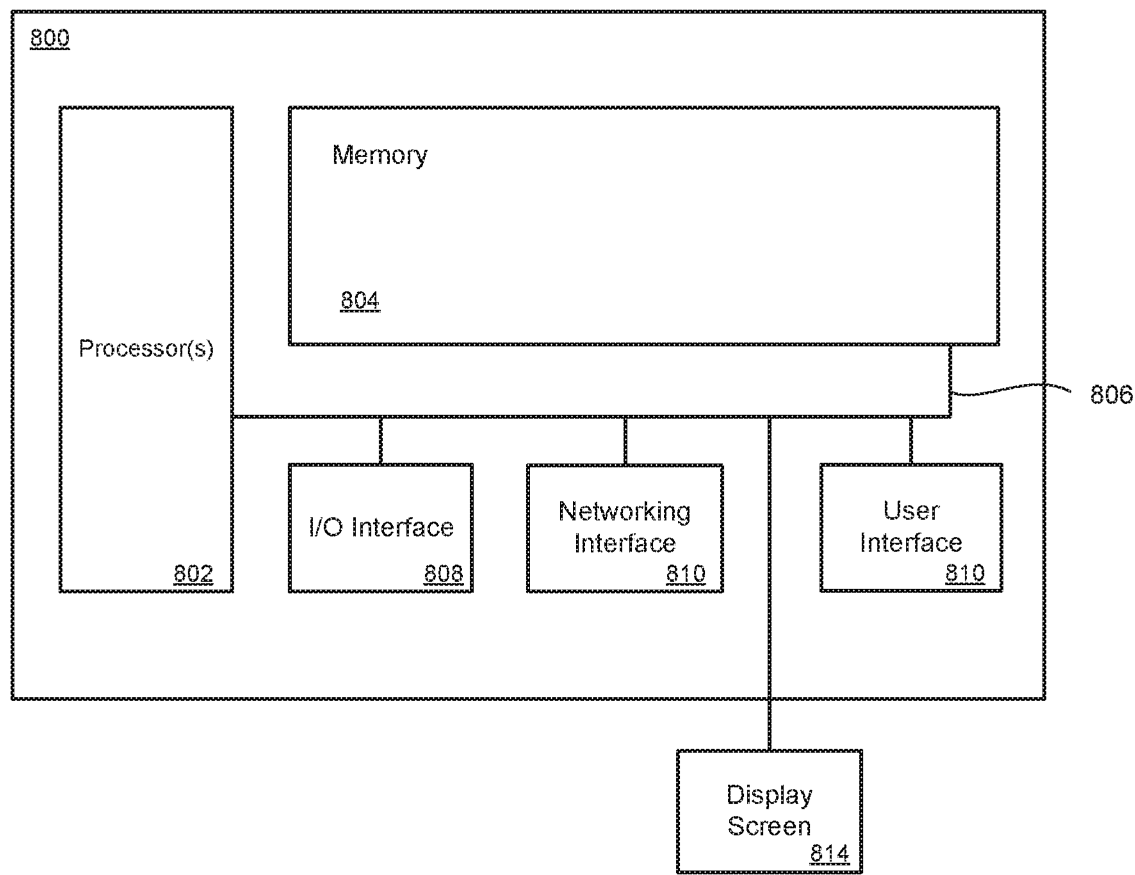
FIG. 8 illustrates a computing system that includes a data storage device in accordance with an example embodiment.

FIG. 8 illustrates a general computing system or device 800 that can be employed in the present technology. The computing system 800 can include a processor 802 in communication with a memory 804. The memory 804 can include any device, combination of devices, circuitry, and the like that is capable of storing, accessing, organizing, and/or retrieving data. Non-limiting examples include SANs (Storage Area Network), cloud storage networks, volatile or non-volatile RAM, phase change memory, optical media, hard-drive type media, and the like, including combinations thereof.

The computing system or device 800 additionally includes a local communication interface 806 for connectivity between the various components of the system. For example, the local communication interface 806 can be a local data bus and/or any related address or control busses as may be desired.

The computing system or device 800 can also include an I/O (input/output) interface 808 for controlling the I/O functions of the system, as well as for I/O connectivity to devices outside of the computing system 800. A network interface 810 can also be included for network connectivity. The network interface 810 can control network communications both within the system and outside of the system. The network interface can include a wired interface, a wireless interface, a Bluetooth interface, optical interface, and the like, including appropriate combinations thereof. Furthermore, the computing system 800 can additionally include a user interface 812, a display device 814, as well as various other components that would be beneficial for such a system.

The processor 802 can be a single or multiple processors, and the memory 804 can be a single or multiple memories. The local communication interface 806 can be used as a pathway to facilitate communication between any of a single processor, multiple processors, a single memory, multiple memories, the various interfaces, and the like, in any useful combination.

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data. The node and wireless device can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations. Exemplary systems or devices can include without limitation, laptop computers, tablet computers, desktop computers, smart phones, computer terminals and servers, storage databases, and other electronics which utilize circuitry and programmable memory, such as household appliances, smart televisions, digital video disc (DVD) players, heating, ventilating, and air conditioning (HVAC) controllers, light switches, and the like.

EXAMPLES

The following examples pertain to specific invention embodiments and point out specific features, elements, or steps that can be used or otherwise combined in achieving such embodiments.

In one example there is provided a storage area network (SAN) node a field programmable gate array (FPGA) that includes a kernel table, and an FPGA controller comprising logic to receive a data request from a remote node, wherein the data request specifies a data payload and a type of operation associated with the data request, select a kernel from the kernel table based on a set of rules, wherein the kernel is matched to the data request in accordance with the set of rules, and the kernel is configured using a bit stream, and execute the kernel in order to perform the data request in accordance with the data payload and the type of operation.

In one example of a SAN node, the type of operation specified in the data request includes a read operation, and the FPGA controller performs the data request by reading the data payload from a storage device.

In one example of a SAN node, the type of operation specified in the data request includes a write operation, and the FPGA controller performs the data request by writing the data payload to a storage device.

In one example of a SAN node, the FPGA controller is configured to maintain the kernel table with a plurality of entries, wherein the kernel table is stored in the FPGA, and each entry includes: an identifier of a kernel that is registered, a bit stream associated with the kernel, and a rule specifying types of data to be processed by the kernel.

In one example of a SAN node, the data request includes one or more of: an identifier that associates the data request with a particular kernel, or a class parameter that associates the data request with a particular type of kernel.

In one example of a SAN node, the FPGA controller is configured to perform an action that is triggered by the data request, and results of the action are provided to one or more remote nodes.

In one example of a SAN node, the FPGA controller is configured to receive, from an application executing on the remote node, a message requesting whether the FPGA includes a kernel, determine, using the kernel table, whether the FPGA includes the kernel; and provide, to the remote node, an acknowledgement (ACK) when the FPGA includes the kernel or a negative acknowledgement (NACK) when the FPGA does not include the kernel.

In one example of a SAN node, the FPGA controller is configured to receive, from an application executing on the remote node, a message requesting a list of kernels included in the kernel table, generate the list of kernels using the kernel table, and the list includes metadata for each kernel on the list, and provide the list of kernels to the remote node.

In one example of a SAN node, the FPGA controller is configured to receive a request to register a kernel, wherein the request includes: a pointer to a memory region in which the bit stream for the kernel is stored, a kernel identifier and kernel metadata, verify that a size of the kernel does not exceed a supported size, and register the kernel by adding the kernel to the kernel table.

In one example of a SAN node, the set of rules are a set of dynamically configurable rules that associate certain kernels in the kernel table to certain types of data requests.

In one example of a SAN node, the SAN node is communicatively coupled to network attached storage (NAS) or disaggregated storage.

In one example there is provided a controller in a storage area network (SAN) node, the controller comprising logic to receive a data request from a remote node, wherein the data request specifies a data payload and a type of operation associated with the data request, select a kernel from a kernel table stored in the memory based on a set of rules, wherein the kernel is matched to the data request in accordance with the set of rules, and the kernel is configured using a bit stream, and execute the kernel in order to perform the data request in accordance with the data payload and the type of operation.

In one example, of a controller, the controller further comprises logic to perform the data request by reading the data payload from a storage device when the type of operation specified in the data request is a read operation, or perform the data request by writing the data payload to a storage device when the type of operation specified in the data request is a write operation.

In one example, of a controller, the kernel table includes a plurality of entries, and each entry includes an identifier of a kernel that is registered, a bit stream associated with the kernel, and a rule specifying types of data to be processed by the kernel.

In one example, of a controller, the data request includes one or more of an identifier that associates the data request with a particular kernel, or a class parameter that associates the data request with a particular type of kernel.

In one example, of a controller, the controller further comprises logic to perform an action that is triggered by the data request, and results of the action are provided to one or more remote nodes.

In one example, of a controller, the set of rules are a set of dynamically configurable rules that associate certain kernels in the kernel table to certain types of data requests.

In one example, there is provided a method comprising receiving, at a SAN node included in the SAN, a data request from a remote node, wherein the data request specifies a data payload and a type of operation associated with the data request, selecting, at the SAN node, a kernel from a kernel table based on a set of rules, wherein the kernel is matched to the data request in accordance with the set of rules, and the kernel is configured using a bit stream, and executing, at the SAN node, the kernel in order to perform the data request in accordance with the data payload and the type of operation.

In one example, a method further comprises performing the data request by reading the data payload from a storage device when the type of operation specified in the data request is a read operation, or performing the data request by writing the data payload to a storage device when the type of operation specified in the data request is a write operation.

In one example, a method comprises performing an action that is triggered by the data request, and results of the action are provided to one or more remote nodes.

In one example, a method comprises receiving, from an application executing on the remote node, a message requesting whether the kernel table includes a kernel, determining whether the kernel table includes the kernel, and providing, to the remote node, an acknowledgement (ACK) when the kernel table includes the kernel or a negative acknowledgement (NACK) when the kernel table does not include the kernel.

In one example, a method comprises receiving, from an application executing on the remote node, a message requesting a list of kernels included in the kernel table, generating the list of kernels using the kernel table, and the list includes metadata for each kernel on the list, and providing the list of kernels to the remote node.

In one example, a method comprises receiving a request to register a kernel, wherein the request includes: a pointer to a memory region in which the bit stream for the kernel is stored, a kernel identifier and kernel metadata, verifying that a size of the kernel does not exceed a supported size, and registering the kernel by adding the kernel to the kernel table.

In one example there is provided a networked system of storage area network (SAN) nodes in a SAN, comprising a memory store, and a plurality of SAN nodes, wherein each SAN node in the plurality of SAN nodes includes a controller comprising logic to receive a data request that specifies a data payload and a type of operation associated with the data request, select a kernel from the kernel table based on a set of rules, wherein the kernel is matched to the data request in accordance with the set of rules, and execute the kernel in order to perform the data request in accordance with the data payload and the type of operation.

In one example of a networked system of SAN nodes, the type of operation specified in the data request includes a read operation, and the controller performs the data request by reading the data payload from the memory store.

In one example of a networked system of SAN nodes, the type of operation specified in the data request includes a write operation, and the controller performs the data request by writing the data payload to the memory store.

While the forgoing examples are illustrative of the principles of invention embodiments in one or more particular applications, it will be apparent to those of ordinary skill in the art that numerous modifications in form, usage and details of implementation can be made without the exercise of inventive faculty, and without departing from the principles and concepts of the disclosure.

What is claimed is:

1. A storage area network (SAN) node comprising:
a field programmable gate array (FPGA) that includes a kernel table; and
an FPGA controller comprising logic to:
receive a data stream from a remote node, wherein the data stream specifies a data payload and a type of operation associated with the data stream;
select a kernel from the kernel table based on a set of dynamically configurable rules, wherein the kernel is matched to the data stream in accordance with the set of dynamically configurable rules, and the kernel is configured using a bit stream; and
execute the kernel in order to perform a computation on the data stream in accordance with the data payload and the type of operation.

2. The SAN node of claim 1, wherein the type of operation specified in the data stream includes a read operation, and the FPGA controller performs the computation on the data stream by reading the data payload from a storage device.

3. The SAN node of claim 1, wherein the type of operation specified in the data stream includes a write operation, and the FPGA controller performs the computation on the data stream by writing the data payload to a storage device.

4. The SAN node of claim 1, wherein the FPGA controller is configured to maintain the kernel table with a plurality of entries, wherein the kernel table is stored in the FPGA, and each entry includes: an identifier of a kernel that is registered, a bit stream associated with the kernel, and a rule specifying types of data streams to be processed by the kernel.

5. The SAN node of claim 1, wherein the data stream includes one or more of: an identifier that associates the data stream with a particular kernel, or a class parameter that associates the data stream with a particular type of kernel.

6. The SAN node of claim 1, wherein the FPGA controller is configured to perform an action that is triggered by the data stream, and results of the action are provided to one or more remote nodes.

7. The SAN node of claim 1, wherein the FPGA controller is configured to:

receive, from an application executing on the remote node, a message requesting whether the FPGA includes a kernel;

determine, using the kernel table, whether the FPGA includes the kernel; and provide, to the remote node, an acknowledgement (ACK) when the FPGA includes the kernel or a negative acknowledgement (NACK) when the FPGA does not include the kernel.

8. The SAN node of claim 1, wherein the FPGA controller is configured to:

receive, from an application executing on the remote node, a message requesting a list of kernels included in the kernel table;

generate the list of kernels using the kernel table, and the list includes metadata for each kernel on the list; and provide the list of kernels to the remote node.

9. The SAN node of claim 1, wherein the FPGA controller is configured to:

receive a request to register a kernel, wherein the request includes: a pointer to a memory region in which the bit stream for the kernel is stored, a kernel identifier and kernel metadata;

verify that a size of the kernel does not exceed a supported size; and register the kernel by adding the kernel to the kernel table.

10. The SAN node of claim 1, wherein the set of dynamically configurable rules associate certain kernels in the kernel table to certain types of data streams.

11. The SAN node of claim 1, wherein the SAN node is communicatively coupled to network attached storage (NAS) or disaggregated storage.

12. An apparatus comprising:

a controller in a storage area network (SAN) node, the controller comprising logic to:

receive a data stream from a remote node, wherein the data stream specifies a data payload and a type of operation associated with the data stream;

select a kernel from a kernel table stored in the memory based on a set of dynamically configurable rules, wherein the kernel is matched to the data stream in accordance with the set of dynamically configurable rules, and the kernel is configured using a bit stream; and execute the kernel in order to perform a computation on the data stream in accordance with the data payload and the type of operation.

13. The apparatus of claim 12, further comprising logic to:

perform the computation on the data stream by reading the data payload from a storage device when the type of operation specified in the data stream is a read operation; or perform the computation on the data stream by writing the data payload to a storage device when the type of operation specified in the data stream is a write operation.

14. The apparatus of claim 12, wherein the kernel table includes a plurality of entries, and each entry includes: an identifier of a kernel that is registered, a bit stream associated with the kernel, and a rule specifying types of data to be processed by the kernel.

15. The apparatus of claim 12, wherein the data stream includes one or more of: an identifier that associates the data stream with a particular kernel, or a class parameter that associates the data stream with a particular type of kernel.

16. The apparatus of claim 12, further comprising logic to perform an action that is triggered by the data stream, and results of the action are provided to one or more remote nodes.

17. The apparatus of claim 12, wherein the set of dynamically configurable rules associate certain kernels in the kernel table to certain types of data streams.

18. A method comprising:

receiving, at a storage area network (SAN) node, a data stream from a remote node, wherein the data stream specifies a data payload and a type of operation associated with the data stream;

selecting, at the SAN node, a kernel from a kernel table based on a set of dynamically configurable rules, wherein the kernel is matched to the data stream in accordance with the set of dynamically configurable rules, and the kernel is configured using a bit stream; and executing, at the SAN node, the kernel in order to perform a computation on the data stream in accordance with the data payload and the type of operation.

19. The method of claim 18, further comprising:

performing the computation on the data stream by reading the data payload from a storage device when the type of operation specified in the data stream is a read operation; or performing the computation on the data stream by writing the data payload to a storage device when the type of operation specified in the data stream is a write operation.

20. The method of claim 18, further comprising performing an action that is triggered by the data stream, and results of the action are provided to one or more remote nodes.

21. The method of claim 18, further comprising:

receiving, from an application executing on the remote node, a message requesting whether the kernel table includes a kernel;

determining whether the kernel table includes the kernel; and providing, to the remote node, an acknowledgement (ACK) when the kernel table includes the kernel or a negative acknowledgement (NACK) when the kernel table does not include the kernel.

22. The method of claim 18, further comprising:

receiving, from an application executing on the remote node, a message requesting a list of kernels included in the kernel table;

generating the list of kernels using the kernel table, and the list includes metadata for each kernel on the list; and providing the list of kernels to the remote node.

23. The method of claim 18, further comprising:

receiving a request to register a kernel, wherein the request includes: a pointer to a memory region in which the bit stream for the kernel is stored, a kernel identifier and kernel metadata;

verifying that a size of the kernel does not exceed a supported size; and registering the kernel by adding the kernel to the kernel table.

24. A system comprising:

a memory store; and a plurality of storage area network (SAN) nodes, wherein each SAN node in the plurality of SAN nodes includes a controller comprising logic to:

receive a data stream that specifies a data payload and a type of operation associated with the data stream;

select a kernel from the kernel table based on a set of rules, wherein the kernel is matched to the data stream in accordance with the set of dynamically configurable rules; and execute the kernel in order to perform a computation on the data stream in accordance with the data payload and the type of operation.

25. The system of claim 24, wherein the type of operation specified in the data stream includes a read operation, and the controller performs the data stream by reading the data payload from the memory store.

26. The system of claim 24, wherein the type of operation specified in the data stream includes a write operation, and the controller performs the data stream by writing the data payload to the memory store.

* * * * *